July 7, 1964
W. ECKOLD
3,139,775
MANUALLY OR POWER DRIVEN APPARATUS FOR THE STRETCHING
OR UPSETTING OF SHEETS OR PROFILES
Filed June 13, 1961
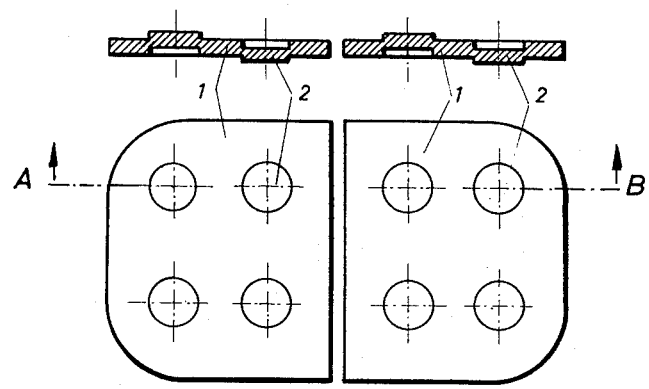
Fig. 1
Fig. 2
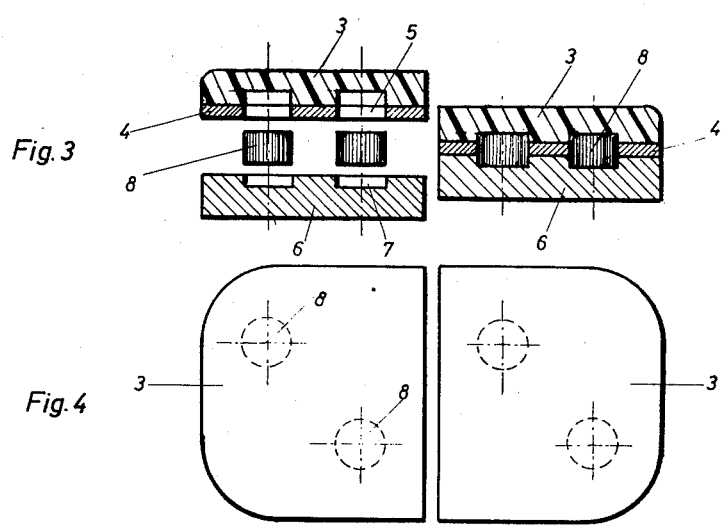
Fig. 3
Fig. 4
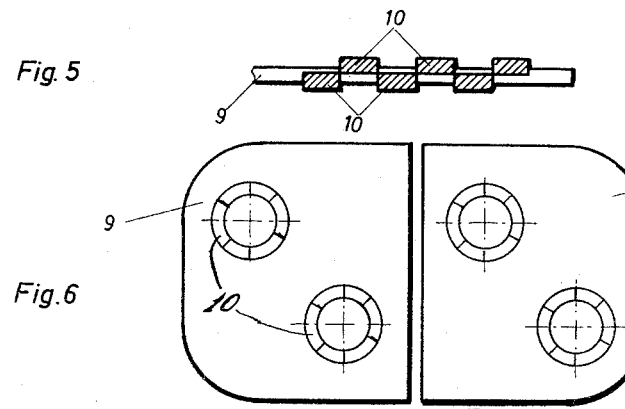
Fig. 5
Fig. 6
*Inventor:*
W. Eckold
By Watson, Cole, Grindle + Watson
Attys.

United States Patent Office 3,139,775
Patented July 7, 1964

3,139,775
MANUALLY OR POWER DRIVEN APPARATUS FOR THE STRETCHING OR UPSETTING OF SHEETS OR PROFILES
Walter Eckold, St. Andreasberg-Sperrluttertal, Oberharz, Germany
Filed June 13, 1961, Ser. No. 116,856
Claims priority, application Germany June 15, 1960
3 Claims. (Cl. 78—61)

The present invention relates to a manually or power driven apparatus for the upsetting or stretching of sheet metals or profiles consisting of a bottom and a top tool, which upon vertical pressure applications clamp the workpiece between each other, and by means of a counterrunning movement of their clamping jaws being provided with pressure plates made of plastic, according to the U.S. application Serial No. 660,340, now abandoned.

It is the object of the present invention to exclude any risk connected with the exchange i.e. with the arranging of new pressure plates resulting from a not correct or not carefully performed adhesive bonding or other securing connection of the pressure plates on the clamping jaws, and consists in that the pressure plates are united with steel soles into a structural unit, e.g. are adhesively bonded or cast, and protrusions at the steel soles, or through holes in the steel soles passed pins, cylinders or similar engage on the one side in the plastic plate and on the other side in respective recesses in the clamping jaws. In a specially for the production of such tools equipped tool shop, there can naturally be made quite different provisions in order to most carefully control the adhesive bonding between the plastic plates and the steel sole, and to thus also guarantee that the plastic plates could not possibly become detached or loosened in spite of heavy stresses and thus loose their functionality. By the embodiment according to the invention there is further obtained a very desirable securing of the pressure plates against rotation.

The subject matter of the present invention is illustrated in the drawing in exemplified form and will be described in greater detail further below in connection with the drawing, in which FIGURE 1 is a cross section of a steel sole unit according to the invention taken on line A—B in the direction of the arrows of FIGURE 2.

FIGURE 2 is a plan view of the unit of FIGURE 1.

FIGURE 3 is a cross section of a complete structural unit according to the invention.

FIGURE 4 is a plan view showing a diagonal arrangement of the connecting cylinders.

FIGURES 5 and 6 are a cross section and a plan view of a further embodiment of a steel sole according to the invention the section of FIG. 5 being taken on line 5—5 of FIG. 6.

In the embodiment according to FIGURES 1 and 2 there are punched eyes 2 alternatingly from the steel sole plate 1, which eyes on the one side engage in recesses or grooves of a pressure plate and on the other side in such recesses in a clamping jaws.

In the embodiment according to the FIGURES 3 and 4 there are arranged with the plastic plates 3 a structural unit combined e.g. adhesively bonded steel soles 4, sinking holes 5 and corresponding sinking holes 7 are arranged in the clamping jaws 6, pins or cylinders 8 forming the actual connection elements. The inclined arrangement of pairs of the cylinders 8 according to FIGURE 4 offers a good connection against rotation of the plastic plates.

In the embodiment according to the FIGURES 5 and 6 there are punched out six sections in the subdivided annular surface of the steel sole 9 to form three annular surface sections 10 as protrusions on each side of the plates 9, this formation being effected alternatingly so that each annular section inserted into the plastic plate follows by one for the engagement with the clamping jaw.

Insofar as the parts are maintained together by means of an adhesive bonding, their function being restricted only to the mechanical unity of the parts, while critical thrust stresses are absorbed by the metallic parts.

The invention can find application for any desired form of tools, this being true in respect to round as well as angular, e.g. rectangular tools.

What I claim is:
1. A structural unit for a manual or power driven apparatus for the upsetting or stretching of sheet metals or profiles comprising a clamping jaw in the form of a plate member having recesses therein, a plastic plate having recesses therein, and a metallic sole plate between the plastic plate and the plate member and composed of protrusions on both sides thereof to project into the recesses in the plastic plate and the plate member, and which are adhesively bonded to each other.

2. A structural unit according to claim 1, in which the sole plate is composed of steel and the protrusions are punched out to project from both sides of the sole plate.

3. A structural unit for a manual or power driven apparatus for the upsetting or stretching of sheet metals or profiles comprising a clamping jaw in the form of a plate member having recesses therein, a plastic plate having recesses therein, a metallic sole plate between the plastic plate and the plate member and having holes therein, and a plurality of cylindrical elements each extending through its respective hole in the sole plate and into the recesses in opposed surfaces of the plate member and the plastic plate.

References Cited in the file of this patent

UNITED STATES PATENTS

| | | |
|---|---|---|
| 2,231,712 | Gleason | Feb. 11, 1941 |
| 2,654,608 | Liebers | Oct. 6, 1953 |
| 2,716,334 | Scott | Aug. 30, 1955 |

FOREIGN PATENTS

| | | |
|---|---|---|
| 541,170 | France | Sept. 30, 1955 |
| 1,177,063 | France | Apr. 20, 1959 |